United States Patent Office 2,880,058
Patented Mar. 31, 1959

2,880,058

PREPARATION OF ALKALI METAL BOROHYDRIDES

Hugh J. Bronaugh, Dover, N.J., assignor, by mesne assignments, to Thiokol Chemical Corporation, a corporation of Delaware No Drawing. Application January 31, 1956
Serial No. 562,587

7 Claims. (Cl. 23—14)

This invention relates to a novel method for the preparation of metal borohydrides. More particularly, it relates to the formation of metal borohydrides by the reaction of the corresponding metal hydrides with the adduct of a lower tertiary aliphatic amine with a boron trihalide.

The alkali metal borohydrides are well known and very useful compounds. They are active reducing agents, advantageous sources of diborane and other boron hydrides and having many other uses. They have been produced in a variety of ways but all of these are subject to one or more defects. Thus, the production of lithium borohydride from lithium hydride and boron trifluoride etherate appears to be described by the following equation:

$$4LiH + BF_3 \cdot Et_2O \rightarrow LiBH_4 + 3LiF + Et_2O$$

The operation must be executed very cautiously to avoid formation of diborane. Another disadvantage is that theoretically one-fourth of the lithium hydride charged is converted to lithium borohydride and three-fourths is converted to lithium fluoride. Both the lithium and the fluorine in the lithium fluoride are too expensive to be discarded. In a large scale operation the necessary recycle operations are tremendous.

The prior art process requires the presence of ethyl ether which makes the operation hazardous and unsuitable for large scale operations. This process is also not adaptable for the production of sodium borohydride in place of lithium borohydride. Simple substitution of sodium hydride for lithium hydride and boron trichloride for boron trifluoride or its etherate result in substantially no reaction to form borohydrides, diborane or other boron hydrides. Thus the reaction represented by the following equation:

$$4NaH + BCl_3 \rightarrow NaBH_4 + 3NaCl$$

does not appear to proceed.

The most successful industrial method for the preparation of sodium borohydride is based on the reaction of sodium hydride with trimethylborate. This reaction must be carried out at elevated temperatures, necessitating the use of considerable pressures to maintain the trimethylborate in the liquid state. At lower temperatures and pressures, yields are poor. In addition, various by-products are formed including sodium tetramethoxyborohydride and sodium trimethoxyborohydride.

The process of the present invention comprises the reaction of a reactive metal hydride, for example, sodium, potassium or lithium hydride with the adduct of a boron halide and a lower tertiary aliphatic amine. An example of the process of the present invention is shown in the following equation:

$$(CH_3)_3N:BCl_3 + 4NaH \rightarrow (CH_3)_3N + NaBH_4 + 3NaCl$$

The reaction is preferably carried out by heating the solid reactants for about one to five hours in the presence of a high-boiling ether which will permit the use of reaction temperatures of about 125–200° C. without the use of pressure. Liberated trimethylamine is returned without further treatment to reaction with additional quantities of boron trichloride to form the amine adduct starting material. Suitable amounts of the ether solvent are used to dissolve all of the borohydride product. Filtration of the reaction mixture serves to separate the by-product salt from the dissolved borohydride which is recovered by distillation of the ether from the residual borohydride. The by-product salt may be extracted to recover additional quantities of the borohydride using additional quantities of the same ether or other solvent for the borohydride, for example, isopropylamine. When such an additional extraction step is practiced, the borohydride is recovered as a residual product by distillation of the extracting agent which is recycled for further use. Where the alkali metal halide is sodium chloride it may be discarded. Using more expensive alkali metal hydrides or more expensive boron halides, it is advantageous to work up the by-product salt for recovery and recycle of the metal or halogen, or both.

Suitable ethers for use in the process of this invention include particularly the dialkyl ethers of polyalkylene glycols having the formula $RO(C_nH_{2n}O)_mR$ where $n$ is 2 or 3, $m$ is 2, 3, or 4 and R is an alkyl group containing not more than 4 carbon atoms, particularly methyl or ethyl. These ethers are especially suitable for use as slurrying agents and solvents in this reaction. The higher-boiling dialkyl ethers, for example, di-n-butyl ether, di-i-amyl ether and other high-boiling dialkyl ethers can also be used when the solubility of the borohydride product is sufficient to permit its separation from the by-product salt. It is a further particular advantage of the dialkyl ethers of polyalkylene glycols that the borohydride product frequently need not be isolated therefrom as the solution is suitable for use in further reactions of the dissolved borohydride as described in Walter J. Sakowski application Serial No. 499,755, filed April 6, 1955.

Tertiary aliphatic amines suitable in combination with the boron halide for formation of the adduct used as a starting material according to the present invention include trimethylamine, triethylamine, tri-n-propylamine and mixed compounds, for example, methyldiethylamine. Adducts of these amines with boron trifluoride, boron trichloride and boron tribromide, are useful starting materials for this process.

Suitable reactive metal hydrides for use according to the present invention include the alkali metal and alkaline earth metal hydrides, more particularly lithium, sodium, potassium, calcium or magnesium hydrides. A molar ratio of alkali metal hydride to amine-boron halide adduct of 4:1 is required and the use of larger proportions of these hydrides is advantageous. The excess can be from about 10 to 50 percent over the theoretical requirement. Much of the excess hydride is recoverable and re-usable. When hydrides of divalent metals are used the minimum molar proportion is 2:1 and an excess is similarly preferred.

A particularly advantageous combination of reactants is sodium hydride and the adduct of trimethylamine with boron trichloride. In this case the tertiary amine is the simplest and cheapest of the tertiary aliphatic amines, boron trichloride is the cheapest boron halide and sodium hydride is the cheapest metal hydride. In addition, the by-product sodium chloride is of such low economic value that it can be discarded without the necessity of working up the by-product alkali metal halide for recovery of metal or halogen.

A further advantage of the process of the preferred example of the present invention is that the trimethylamine is readily separated as a gas from the reaction mixture and recycled without the necessity for intermediate treatment to the formation of further quantities of the trimethylamine-boron trichloride adduct. This adduct is a solid which is sufficiently stable in air to offer the advantage of ease of handling.

The preferred solvents of the present invention dissolve the resulting borohydride to a sufficient extent that the desired product can be readily separated in solution from the insoluble alkali metal halide. Thus, sodium borohydride is soluble in diethylene glycol dimethyl ether to the extent of about 9 percent by weight. The borohydride is stable and has a very low pressure so that separation of the ether solvent by distillation is very simple. It can be removed by distillation at atmospheric or reduced pressure. Substantially pure alkali metal borohydride is obtained as a residual product. Any residual high-boiling ether in the solid borohydride can be readily removed by slurrying the solid with an inert solvent for the high-boiling ether, for example, ethyl ether, which is readily removed from the purified borohydride. The wash solvent can be removed, for example, by centrifuging and distilling for re-use.

The reaction can be carried out at substantially atmospheric pressure or under reduced or super-atmospheric pressure. Pressures not substantially different from atmospheric pressure are especially advantageous.

In the following examples the term "moles" signifies gram moles.

Example I

A stainless steel reaction vessel having an internal volume of 48 ml. was charged with 0.172 mole of finely powdered sodium hydride, 0.0368 mole of trimethyl amine-boron trichloride adduct and about 10 ml. of diethylene glycol dimethyl ether. The reaction vessel was closed, evacuated and shaken during a period of 2 hours while the contents were maintained at 151–157° C. At the end of the 2-hour heating period, the vessel and contents were allowed to cool to about 25° C. and opened, venting the trimethylamine. The residue was filtered at a temperature of about 25° C. to separate the insoluble sodium chloride and the ether solution of sodium borohydride. Analyses showed that some borohydride was present in both phases. The solution was evaporated to dryness and the residue washed with diethyl ether. It was identified as sodium borohydride by hydrogen and boron analyses which showed a ratio of 3.88:1. The total yield of sodium borohydride was 24.5 percent.

Example II

A stirred reaction vessel is charged with sodium hydride and trimethylamine-boron trichloride adduct using a 20 percent excess of sodium hydride over the theoretical molar ratio of 4:1 and sufficient diethylene glycol dimethyl ether to make a stirrable slurry of the reactants. The mixture is stirred and heated at a temperature of about 150–160° C. for 2 hours allowing trimethylamine to escape from the reaction vessel through a reflux condenser to a cold trap in which it condenses. At this temperature the diethylene glycol dimethyl ether refluxes slowly. After two hours the reaction mixture is cooled and filtered, washing the by-product sodium chloride with additional diethylene glycol dimethyl ether to remove sodium borohydride substantially therefrom. The combined filtrates are evaporated, recovering the diethylene glycol dimethyl ether overhead and reducing the solution to a slurry. The residue is filtered and washed with diethyl ether to remove residual diethylene glycol dimethyl ether and dried to recover the pure sodium borohydride.

Example III

A slurry of 10.9 grams (0.455 mole) of sodium hydride in 168 grams of diethylene glycol dimethyl ether was stirred at 140° C. while 14.2 grams (0.0805 mole) of trimethylamine-boron trichloride adduct was added over a period of 15 minutes. The reaction was continued for 30 minutes during the last ten minutes of which a slow stream of nitrogen was passed through the system. Trimethylamine amounting to 0.052 mole was recovered. The reaction slurry was filtered, separating 25.7 grams of solids and 151 grams of filtrate. The latter contained 0.0226 mole of sodium borohydride, representing a yield of about 28 percent based on the trimethylamine-boron trichloride adduct. Additional quantities of sodium borohydride were present in the solid residue.

I claim:

1. A method for the preparation of a borohydride which comprises reacting an alkali metal hydride with an adduct of a lower tertiary aliphatic amine and a boron trihalide within a temperature range from about 125° to about 200° C.

2. The method of claim 1 wherein said hydride is sodium hydride.

3. The method of claim 1 wherein said amine is trimethylamine.

4. The method of claim 1 wherein said boron trihalide is boron trichloride.

5. The method of claim 1 wherein said hydride is sodium hydride, said amine is trimethylamine and said trihalide is borontrichloride.

6. The method of claim 1 wherein the reaction is conducted in a reaction medium composed of at least one ether of the formula $RO(C_nH_{2n}O)_mR$ wherein $n$ is an integer from 2 to 3, $m$ is an interger from 2 to 4 and wherein R is an alkyl radical having not more than 4 carbon atoms.

7. The method of claim 6 wherein said ether is diethylene glycol dimethyl ether.

References Cited in the file of this patent

UNITED STATES PATENTS

| 2,684,888 | Pryde | July 27, 1954 |
| 2,741,540 | Bragdon et al. | Apr. 10, 1956 |

OTHER REFERENCES

Burg et al.: "J.A.C.S.," vol. 62, pp. 3425–3429 (December 1940).

Sidgwick: "Chemical Elements and Their Compounds," vol. 1, page 402 (1950), University Press, Oxford.